United States Patent [19]

Moggi et al.

[11] Patent Number: 4,544,708

[45] Date of Patent: Oct. 1, 1985

[54] VULCANIZABLE FLUOROELASTOMER COMPOSITIONS PROVIDING VULCANIZATES HAVING HIGH ADHESION TO METALS

[75] Inventors: Giovanni Moggi, Milan; Gianna Cirillo, Genoa, both of Italy

[73] Assignee: Montedison S.p.A., Milan, Italy

[21] Appl. No.: 583,398

[22] Filed: Feb. 24, 1983

[30] Foreign Application Priority Data

Mar. 22, 1983 [IT] Italy ................................ 20197 A/83

[51] Int. Cl.$^4$ ............................................... C08F 8/00
[52] U.S. Cl. ................................ 525/337; 525/330.7; 525/340; 525/368; 525/369; 525/370; 525/371
[58] Field of Search ................ 525/340, 371, 330.7, 525/337, 368, 369, 370

[56] References Cited

U.S. PATENT DOCUMENTS

| | | | |
|---|---|---|---|
| 3,922,468 | 11/1975 | Burtie, Jr. et al. | 428/524 |
| 3,988,502 | 10/1976 | Patel et al. | 526/254 |
| 4,251,399 | 2/1981 | Tomoda et al. | 525/104 |
| 4,259,463 | 3/1981 | Moggi et al. | 525/340 |

Primary Examiner—Joseph L. Schofer
Assistant Examiner—Bernard Lipman

[57] ABSTRACT

Vulcanizable fluoroelastomer compositions based on vinylidene fluoride, comprising, as a vulcanizing system, a polyhydroxyl aromatic compound, a divalent metal compound of basic nature, and an accelerator consisting of a salt of ammonium or of phosphonium or of quaternary amino-phosphonium in which the anion is a complex of a Cd or Zn or Ni or Pb halide.

2 Claims, No Drawings

VULCANIZABLE FLUOROELASTOMER COMPOSITIONS PROVIDING VULCANIZATES HAVING HIGH ADHESION TO METALS

BACKGROUND OF THE INVENTION

One of the most important uses of fluorinated elastomers is the manufacture of seals for both static and dynamic utilizations. A particularly important field in this respect is that of the sealing on rotary shafts by means of oil seal rings. In such case it is absolutely necessary that a perfect adhesion capable of remaining quite unaltered even at high temperatures (200°–250° C.) may take place between the fluoroelastomer constituting the sealing element and the metal insert.

In the known processes for vulcanizing fluoroelastomers, diamine compounds such as carbamates were often used in the past and, to a lesser extent, also at present. However, these accelerating-vulcanizing agents though permitting to obtain satisfactory adhesion values, exhibit the drawback of rendering the processing little safe due to the occurrence of scorching phenomena.

With the systems based on bisphenol cross-linking agents, such as for example bisphenol AF, on accelerators based on quaternary salts of phosphonium or of amino-phosphonium, in which the anion is mostly chloride, bromide or tetrafluoroborate, scorching phenomena are avoided, but the adhesion values are low. When, by means of proper formulations, nearly acceptable adhesion values are reached, these are limited to a narrow concentration range of the accelerating agent, as is proved by examples 34 through 36 and 46 through 48.

THE PRESENT INVENTION

It has been now surprisingly found, and this is the object of the present invention, that it is possible to obtain high rubber/metal adhesion values when the phosphonium compound or the amino-phosphonium compound or the ammonium compound which acts as an accelerator is present in the form of a compound having as a counteranion a complex anion of cadmium, zinc, lead or nickel, such as e.g. $CdCl_4^{--}$, $Cd_2Cl_6^{--}$, $CdCl_2Br_2^{--}$, $CdBr_4^{--}$, $CdCl_2I_2^{--}$, $ZnCl_2Br_2^{--}$, $ZnCl_3 \cdot P(C_6H_5)_3^{-}$, or of boron, such as $B(C_6H_5)_4^{-}$.

A typical characteristic of the accelerators according to the present invention is that of permitting to attain with them high adhesion values in a wide concentration range of the accelerator, which enables an operator to obtain satisfactory results even if in the steps for preparing the vulcanizable mixes the accelerator was not homogeneously dispersed and its concentration in the mix is locally different from point to point.

The vulcanization accelerators based on a phosphonium or amino-phosphonium or ammonium cation have, as a usual counteranion, $Cl^-$, $Br^-$, $BF_4^-$ and are used at concentrations of about 1 millimole for 100 g of fluoroelastomer.

The accelerators forming the object of this invention, conversely, can be advantageously employed in a concentration range of from 0.8 to 2.5 milliequivalents of phosphonium or amino-phosphonium or ammonium compound for 100 g of fluoroelastomer without scorching phenomena are observed, so having the possibility of achieving quick or slow cross-linking kinetics, depending on the requirements of each particular type of rubber processing.

In general, the present invention relates to a vulcanizable fluoroelastomeric composition, comprising:

(A) a copolymer of elastomeric nature based on vinylidene fluoride and on at least another fluorinated monomer;

(B) a substance having the property of neutralizing acids and selected from the oxides of divalent metals, the hydroxides of divalent metals and mixtures of such oxides or hydroxides with metal salts of weak acids;

(C) an aromatic polyhydroxyl compound suited to act as a vulcanizing agent for the copolymer;

(D) as a vulcanization accelerator, a salt composed by a cation of phosphonium or of amino-phosphonium or of ammonium, the formula thereof is selected from amongst those already known in the art and broadly described for example in U.S. Pat. Nos. 3,876,654; 4,259,463 and in GB Pat. No. 1,356,344 respectively, and by a complex anion, in which one atom or two atoms of a metal selected from Cd (II), Zn (II), Pb (II), Ni (II) is, respectively are bound to chlorine, bromine, iodine atoms and optionally also to a trisubstituted phosphinic binder, such as e.g.: $P(C_6H_5)_3$, $P[N(CH_3)(C_6H_5)]_3$. The abovesaid complex anion is represented by one of the following formulas:

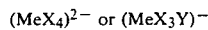

$$(MeX_4)^{2-} \text{ or } (MeX_3Y)^{-}$$

wherein Me is one of the abovesaid metals, X is Cl, Br, I, and Y is said phosphinic binder. Furthermore, the anion may be tetraphenyborane $B(C_6H_5)_4^{-}$, or it may be of the type containing two metal atoms, such as hexachlorodicadmiate:

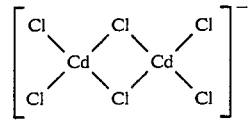

Peeling tests (ASTM D 429) are generally utilized to evaluate the adhesion between elastomer and metal.

This kind of test, however, permits to evaluate the tearing and cracking phenomena occurring in the vulcanized composition, rather than the adhesion of the elastomeric portion to the metal. To obviate this shortcoming, another adhesion evaluation method was utilized. In particular, standard ASTM D 1893, which is specific for plastics, was adapted for the case elastomer/metal. This standard contemplates the quantitative evaluation of the adhesion degree between two layers of alike or different polymeric films.

In the present case, test pieces consisting of metal, adhesive, elastomer were prepared.

The elastomer/metal bonding was accomplished in 3 steps:

(a) small metal plates (carbon steel Fe 37 A I; dimensions: 80×25×2 mm) were prepared by degreasing them in an ALGOFRENE®113 vapor bath, and by sandblasting with corundum the areas intended for adhesion, and by degreasing them once again;

(b) the adhesive was applied by means of spraying to the metal so prepared. Chemosil 511 (trademark of Henkel) was utilized as an adhesive;

(c) the adhesion between the metal treated with the adhesive and the elastomer is accomplished during the vulcanization-in-press step (elastomer thickness: 8 mm).

To obtain an effective adhesion it is necessary that the cross-linking rate of the mix and the one of the adhesive be of the same order of magnitude.

Molding conditions: P=66 kg/cm²; T°=170° C.; time: variable as a function of the accelerator type and of its concentration.

On the test pieces so prepared there was measured the strength necessary to detach the elastomer from the treated metal, using a flat drawn piece (dimensions: 25×2 mm) which moved perpendicularly to the test pieces axis at a uniform speed of 50 mm/minute.

The results are expressed in mass unit per length unit.

In a few cases, due to the high adhesion values attained with the compounds of the present invention, is was not possible to measure the adhesive strength since tearing phenomena occurred in the elastomer.

In these cases, the adhesive strength may be considered to be higher than the measured value (as is indicated in Tables I–IV).

EXAMPLES 1–12

(Table I)

Vulcanization accelerators capable of providing, in a wide concentration range, vulcanized compositions with high rubber/metal adhesion values, divided by cation classes of the accelerator molecule.
Cation: trisdimethylaminobenzyl-phosphonium:

$$P^+(C_6H_5CH_2)[N(CH_3)_2]_3$$

Anions:

A.1 Chloride (check product) M.P.=208° C. It was prepared as is described in literature (Monsanto U.S. Pat. No. 2,703,814).

A.2 Tetrafluoroborate (check product) M.P.=146° C. It was prepared from the preceding product by treatment with an aqueous solution of sodium tetrafluoroborate.

A.3 Tetrachlorocadmiate—M.P.=148° C. It was prepared from a methanol solution of A.1 (2 moles) with one mole of anhydrous cadmium chloride in methanol, and by evaporating the solvent.

A.4 Tetraphenylborate (M.P.=187° C.). It was prepared from an aqueous solution of A.1 with an equimolecular amount of sodium tetraphenylborate.

Explanatory notes applying to all the Tables:
(1) According to ASTM D 2084–75.
(2) According to ASTM D 1646–74 using a small size rotor.
(3) According to ASTM D 412–75 on 2 mm thick test pieces.
(4) According to ASTM D 1415–74 on 6 mm thick test pieces, reading after 30 seconds.
(5) According to ASTM D 395–75 method B.
(6) According to ASTM D 1893 (see the foregoing references to adaptation of ASTM D 1983). $T_s2$ = time in minutes required to get an increase in the lowest value by 2 in.lbs.
$T_c(50)$ = time in minutes required to get a torque of 50 in.lbs.

TABLE No. 1

| FORMULATION No. | 1 | 2 | 3 | 4 | 5 | 6 | 7 | 8 | 9 | 10 | 11 | 12 |
|---|---|---|---|---|---|---|---|---|---|---|---|---|
| Tecnoflon NM p. by weight | 100 | 100 | 100 | 100 | 100 | 100 | 100 | 100 | 100 | 100 | 100 | 100 |
| MgO (Maglite D) p. by weight | 25 | 5 | 5 | 5 | 5 | 5 | 5 | 5 | 5 | 5 | 5 | 5 |
| Ca(OH)₂ p. by weight | 5 | 5 | 5 | 5 | 5 | 5 | 5 | 5 | 5 | 5 | 5 | 5 |
| Carbon black MI p. by weight | 25 | 25 | 25 | 25 | 25 | 25 | 25 | 25 | 25 | 25 | 25 | 25 |
| Bisphenol AF p. by weight | 1.8 | 1.8 | 1.8 | 1.8 | 1.8 | 1.8 | 1.8 | 1.8 | 1.8 | 1.8 | 1.8 | 1.8 |
| Accelerator: A4 m. equivalents | 1 | 1.5 | 2 | — | — | — | — | — | — | — | — | — |
| Accelerator: A3 m. equivalents | — | — | — | 1 | 1.5 | 2 | — | — | — | — | — | — |
| Accelerator: A2 m. equivalents | — | — | — | — | — | — | 1.0 | 1.5 | 2.1 | — | — | — |
| Accelerator: A1 m. equivalents | — | — | — | — | — | — | — | — | — | 1.0 | 1.5 | 2.0 |
| Thermomechanical characteristics O.D.R. 175° C. (1) | | | | | | | | | | | | |
| Minimum torque in. lbs. | 12 | 14 | 12 | 10 | 10 | 15 | 13 | 13 | 16 | 16 | 17 | 19 |
| Maximum torque in. lbs. | 115 | 128 | 124 | 100 | 104 | 110 | 102 | 110 | 119 | 106 | 110 | 115 |
| $T_s2$ minutes | 2.9 | 2.4 | 2.3 | 2.1 | 1.3 | 1.2 | 2.8 | 1.9 | 1.7 | 3.9 | 3.0 | 2.1 |
| $T_c(50)$ minutes | 4.3 | 3.3 | 3.1 | 3.9 | 2.3 | 2.0 | 4.7 | 2.9 | 2.3 | 6.3 | 3.8 | 2.9 |
| Viscosity | | | | | | | | | | | | |
| Mooney MS at 121° C. (2) minimum | 48 | 47 | 44 | 45 | 47 | 46 | 50 | 48 | 46 | 47 | 46 | 44 |
| minutes for 10 point increase: | 60 | 55 | 50 | 60 | 55 | 50 | 55 | 50 | 45 | 50 | 40 | 35 |
| Vulcanization in press at 170° C. × 10 minutes in oven at 250° C. × 16 hours | | | | | | | | | | | | |
| 100% elongation modulus kg/cm² (3) | 76 | 78 | 80 | 70 | 72 | 74 | 65 | 68 | 68 | 62 | 70 | 91 |
| Tensile strength kg/cm² (3) | 177 | 165 | 155 | 160 | 155 | 150 | 160 | 150 | 145 | 160 | 160 | 164 |
| Elongation at break % (3) | 167 | 160 | 157 | 190 | 180 | 170 | 195 | 180 | 170 | 175 | 165 | 151 |
| Hardness, IRHD (4) | 72 | 73 | 74 | 73 | 72 | 72 | 73 | 72 | 74 | 74 | 75 | 73 |
| Compression set, on O-Rings (φ 25.4 × 3.53 mm): (5) | | | | | | | | | | | | |
| at 200° C. × 70 hours | 18 | 19 | 20 | 20 | 20 | 21 | 17 | 18 | 20 | 18 | 20 | 22 |
| at 200° C. × 168 hours | 29 | 30 | 32 | 28 | 30 | 32 | 30 | 28 | 32 | 27 | 30 | 33 |
| Adhesive strength (kg · cm⁻¹) (6) | | | | | | | | | | | | |
| after vulcanization in press at 170° C. × 8 minutes | 33 | 32 | 30 | 41 | 25 | 23 | 12 | 10 | 4 | 3 | 6 | 8 |
| after post-vulcanization in oven at 250° C. × 16 hours | 16 | 16 | 15 | 36 | 23 | 20 | 16 | 8 | 6 | (0)* | (0)* | (0)* |
| after post-vulcanization in oven at 250° C. × 16 hours and aqueous treatment at 100° C. × 48 hours | 14 | 12 | 12 | 30 | 20 | 18 | 2 | 4 | 3 | (0)* | (0)* | (0)* |

*adhesion not measurable

EXAMPLES 13-21
(Table 2)

Cation: hydroxyethyltriphenylphosphonium = $[HOCH_2CH_2P(C_6H_5)_3]^+$

Anions:
- B.1 Tetrachlorocadmiate: it was prepared as is described in Inorganica Chimica Acta 60, (1982) 135-139—M.P.=164° C.
- B.2 Chloride (check product). This compound was prepared by reacting equimolecular amounts of triphenylphosphine and ethylene chlorohydrin in toluene, at reflux during four hours—M.P.=244° C.
- B.3 Tetrafluoroborate (check product). It was prepared from a solution of B.2 in water with an equimolar solution of sodium tetrafluoroborate—M.P.=167° C.

EXAMPLES 22-33
(Table 3)

Cation: benzyltriphenylphosphonium = $[C_6H_5CH_2P(C_6H_5)_3]^+$

Anions:
- C.1 Tetrachlorocadmiate—M.P.=218° C. It was prepared as is described in Inorganica Chimica Acta, 60, 153 (1982).
- C.2 Hexachlorocadmiate—M.P. 225° C., prepared as is described in Inorganica Chimica Acta, 60, 153 (1982).
- C.3 Chloride (check compound)—M.P.=307° C. (decomposition); a sample produced by Messrs Fluka was utilized.
- C.4 Perchlorate (check compound). It was prepared from an aqueous solution of C.3 with equimolar amounts of a saturated solution of sodium perchlorate—M.P.=242° C.

TABLE No. 2

| FORMULATION No. | 13 | 14 | 15 | 16 | 17 | 18 | 19 | 20 | 21 |
|---|---|---|---|---|---|---|---|---|---|
| Tecnoflon NM p. by weight | 100 | 100 | 100 | 100 | 100 | 100 | 100 | 100 | 100 |
| MgO (Maglite D) p. by weight | 5 | 5 | 5 | 5 | 5 | 5 | 5 | 5 | 5 |
| Ca(OH)$_2$ p. by weight | 5 | 5 | 5 | 5 | 5 | 5 | 5 | 5 | 5 |
| Carbon black MT p. by weight | 25 | 25 | 25 | 25 | 25 | 25 | 25 | 25 | 25 |
| Bisphenol AF | 1.8 | 1.8 | 1.8 | 1.8 | 1.8 | 1.8 | 1.8 | 1.8 | 1.8 |
| Accelerator: B.1 m. equivalents | 1 | 1.5 | 2 | — | — | — | — | — | — |
| Accelerator: B.2 m. equivalents | — | — | — | 1 | 1.5 | 2 | — | — | — |
| Accelerator: B.3 m. equivalents | — | — | — | — | — | — | 1.0 | 1.5 | 2.0 |
| Thermomechanical characteristics O.D.R. 175° C. (1) | | | | | | | | | |
| Minimum torque in. lbs. | 18 | 18 | 18 | 16 | 17 | 18 | 15 | 16 | 17 |
| Maximum torque in. lbs. | 85 | 94 | 96 | 70 | 78 | 86 | 73 | 80 | 96 |
| T$_s$2 minutes | 5.2 | 3.8 | 3.0 | 5.5 | 3.4 | 2.4 | 6 | 3.5 | 2.5 |
| T$_c$(50) minutes | 12.2 | 6.7 | 4.7 | 11.5 | 6.0 | 3.7 | 12 | 6.5 | 3.7 |
| Viscosity | | | | | | | | | |
| Mooney MS at 100° C. (2) minimum | 50 | 50 | 48 | 52 | 50 | 49 | 52 | 50 | 52 |
| minutes for 10 point increase: | 60 | 58 | 55 | 55 | 50 | 45 | 65 | 60 | 55 |
| Vulcanization in press at 170° C. × 10 minutes in oven at 250° C. × 16 hours | | | | | | | | | |
| 100% elongation modulus kg/cm$^2$ (3) | 55 | 56 | 60 | 55 | 60 | 65 | 60 | 65 | 70 |
| Tensile strength kg/cm$^2$ (3) | 160 | 162 | 155 | 155 | 150 | 150 | 165 | 160 | 155 |
| Elongation at break % (3) | 210 | 199 | 185 | 200 | 195 | 180 | 195 | 190 | 180 |
| Hardness, IRHD (4) | 75 | 73 | 72 | 75 | 74 | 72 | 72 | 71 | 71 |
| Compression set, on O-Rings (0 25.4 × 3.53 mm): (5) | | | | | | | | | |
| at 200° C. × 70 hours | 16 | 17 | 19 | 17 | 19 | 22 | 16 | 18 | 21 |
| at 200° C. × 168 hours | 28 | 30 | 31 | 29 | 29 | 33 | 27 | 29 | 30 |
| Adhesive strength (kg · cm$^{-1}$) (6) | | | | | | | | | |
| after vulcanization in press at 170° C. × 9 minutes | >34(*) | >25 | >27 | 15 | 15 | 9 | (0)* | 2 | 3 |
| after post-vulcanization in oven at 250° C. × 16 hours | >21 | >19 | >18 | 23 | 23 | 12 | 12 | 6 | 16 |
| after post-vulcanization in oven at 250° C. × 16 hours and aqueous treatment at 100° C. × 48 hours | 20 | 19 | 13 | 16 | 15 | 10 | | | |
| after post-vulcanization in oven at 100° C. × 48 hours | | | | | | | 12 | 5 | 14 |

(*) Vulcanization in press at 170° C. for 18 minutes
(0) Adhesion not measurable

TABLE No. 3

| FORMULATION NO. | 22 | 23 | 24 | 25 | 26 | 27 | 28 | 29 | 30 | 31 | 32 | 33 |
|---|---|---|---|---|---|---|---|---|---|---|---|---|
| Tecnoflon NM p. by weight | 100 | 100 | 100 | 100 | 100 | 100 | 100 | 100 | 100 | 100 | 100 | 100 |
| MgO (Maglite D) p. by weight | 5 | 5 | 5 | 5 | 5 | 5 | 5 | 5 | 5 | 5 | 5 | 5 |
| Ca(OH)$_2$ p. by weight | 5 | 5 | 5 | 5 | 5 | 5 | 5 | 5 | 5 | 5 | 5 | 5 |
| Carbon black MT p. by weight | 25 | 25 | 25 | 25 | 25 | 25 | 25 | 25 | 25 | 25 | 25 | 25 |
| Bisphenol AF | 1.8 | 1.8 | 1.8 | 1.8 | 1.8 | 1.8 | 1.8 | 1.8 | 1.8 | 1.8 | 1.8 | 1.8 |
| Accelerator: C.1 m. equivalents | 1 | 1.5 | 2 | — | — | — | — | — | — | — | — | — |
| Accelerator: C.2 m. equivalents | — | — | — | 1 | 1.5 | 2 | — | — | — | — | — | — |
| Accelerator: C.3 m. equivalents | — | — | — | — | — | — | — | — | — | 1.0 | 1.5 | 2.0 |
| Accelerator: C.4 m. equivalents | — | — | — | — | — | — | 1.0 | 1.5 | 2.0 | — | — | — |
| Thermomechanical characteristics | | | | | | | | | | | | |

TABLE No. 3-continued

| FORMULATION NO. | 22 | 23 | 24 | 25 | 26 | 27 | 28 | 29 | 30 | 31 | 32 | 33 |
|---|---|---|---|---|---|---|---|---|---|---|---|---|
| O.D.R. 175° C. (1) | | | | | | | | | | | | |
| Minimum torque in. lbs. | 14 | 16 | 17 | 16 | 14 | 12 | 16 | 17 | 18 | 12 | 14 | 15 |
| Maximum torque in. lbs. | 90 | 110 | 113 | 76 | 94 | 92 | 86 | 90 | 96 | 80 | 108 | 115 |
| $T_s$ 2 minutes | 4.8 | 4.4 | 4 | 6 | 3.7 | 2.6 | 6.7 | 6.0 | 5.7 | 4.0 | 2.5 | 1.8 |
| $T_c(50)$ minutes | 12.8 | 7.7 | 5.7 | 10.2 | 6.1 | 4.1 | 23.5 | 19 | 15 | 6.8 | 3.8 | 2.8 |
| Viscosity | | | | | | | | | | | | |
| Mooney MS at 121° C. (2) Minimum | 55 | 60 | 55 | 54 | 58 | 56 | 56 | 58 | 58 | 60 | 58 | 58 |
| minutes for 10 point increase: | 65 | 60 | 60 | 70 | 65 | 65 | 60 | 55 | 55 | 65 | 55 | 50 |
| Vulcanization | | | | | | | | | | | | |
| in press at 170° C. × 10 minutes | | | | | | | | | | | | |
| in oven at 250° C. × 16 hours | | | | | | | | | | | | |
| 100% elongation modulus kg/cm$^2$ (3) | 58 | 65 | 73 | 60 | 65 | 70 | 60 | 59 | 58 | 65 | 56 | 55 |
| Tensile strength kg/cm$^2$ (3) | 161 | 165 | 168 | 170 | 165 | 160 | 175 | 170 | 166 | 174 | 168 | 160 |
| Elongation at break % (3) | 188 | 182 | 180 | 195 | 190 | 190 | 200 | 198 | 190 | 195 | 193 | 188 |
| Hardness, IRHD (4) | 70 | 71 | 72 | 73 | 72 | 71 | 75 | 74 | 72 | 72 | 72 | 71 |
| Compression set, on | | | | | | | | | | | | |
| O-Rings ($\phi$ 25.4 × 3.53 mm): (5) | | | | | | | | | | | | |
| at 200° C. × 70 hours | 16 | 16 | 17 | 16 | 17 | 18 | 17 | 18 | 21 | 19 | 21 | 22 |
| at 200° C. × 168 hours | 25 | 28 | 29 | 26 | 28 | 29 | 29 | 30 | 32 | 28 | 31 | 32 |
| Adhesive strength (kg · cm$^{-1}$) (6) | | | | | | | | | | | | |
| after vulcanization in press AT 170° C. × 8 minutes | >42 | >46 | >47 | 24* | 19 | 31 | 14** | 13** | 12** | 9 | 7 | 5 |
| after post-vulcanization in oven at 250° C. × 16 hours | >37 | >30 | >25 | 14 | 16 | 30 | 13 | 12 | 10 | >21 | 10 | 5 |
| after post-vulcanization in oven at 250° C. × 16 hours and aqueous treatment at 100° C. × 48 hours | 31 | 25 | 21 | 19 | 11 | 16 | 11 | 10 | 8 | 21 | 8 | 4 |

*Vulcanization in press at 170° C. for 15 minutes
**Vulcanization in press at 170° C. for 35 minutes

EXAMPLES 34–45

(Table 4)

Cation: benzyltriethylammonium [N(C$_2$H$_5$)$_3$CH$_2$C$_6$H$_5$]$^+$
Anions:
D.1 Chloride (check), produced by Fluka Co.
D.2 Tetrachlorocadmiate—M.P. = 102° C. It was prepared from 1 mole of CdCl$_2$ + 2 moles of D.1 in methanol.

Cation: methyl-tributyl-ammonium [N(C$_4$H$_9$)$_3$CH$_3$]$^+$
Anions:
D.3 Iodide (check), produced by Fluka Co.
D.4 Tetraiodocadmiate—M.P. = 102° C. It was prepared from 1 mole of CdI$_2$ and 2 moles of D.3 in ethanol.

EXAMPLES 46–51

(Table 5)

In these examples, the terpolymer Tecnoflon TN produced by Montedison, having the following molar composition: vinylidene fluoride = 67%, hexafluoropropene = 18%, tetrafluoroethylene = 15%, was utilized as an elastomer. It can be observed how the accelerators according to the present invention enable, also in this case, to obtain vulcanized articles with high rubber/metal adhesion values. The results are recorded on Table 5.

The accelerating system was composed by the diethylamino-diphenyl-benzyl-phosphonium cation, while the anion was respectively:

TABLE NO. 4

| FORMULATION No. | 34 | 5 | 36 | 37 | 38 | 39 | 40 | 41 | 42 | 43 | 44 | 45 |
|---|---|---|---|---|---|---|---|---|---|---|---|---|
| Tecnoflon NM p. by weight | 100 | 100 | 100 | 100 | 100 | 100 | 100 | 100 | 100 | 100 | 100 | 100 |
| MgO (Maglite D) p. by weight | 5 | 5 | 5 | 5 | 5 | 5 | 5 | 5 | 5 | 5 | 5 | 5 |
| Ca(OH)$_2$ p. by weight | 5 | 5 | 5 | 5 | 5 | 5 | 5 | 5 | 5 | 5 | 5 | 5 |
| Carbon black MT p. by weight | 25 | 25 | 25 | 25 | 25 | 25 | 25 | 25 | 25 | 25 | 25 | 25 |
| Bisphenol AF p. by weight | 1.8 | 1.8 | 1.8 | 1.8 | 1.8 | 1.8 | 1.8 | 1.8 | 1.8 | 1.8 | 1.8 | 1.8 |
| Accelerator: D.1 m. equivalents | 1.0 | 1.5 | 2.0 | — | — | — | — | — | — | — | — | — |
| Accelerator: D.2 m. equivalents | — | — | — | 1.0 | 1.5 | 2.0 | — | — | — | — | — | — |
| Accelerator: D.3 m. equivalents | — | — | — | — | — | — | 1.0 | 1.5 | 2.0 | — | — | — |
| Accelerator: D.4 m. equivalents | — | — | — | — | — | — | — | — | — | 1.0 | 1.5 | 1.0 |
| Thermomechanical characteristics | | | | | | | | | | | | |
| O.D.R. 175° C. (1) | | | | | | | | | | | | |
| Minimum torque in. lbs. | 16 | 16 | 16 | 16 | 17 | 16 | 10 | 10 | 8 | 8 | 8 | 8 |
| $T_s$ 2 minutes | 5.5 | 3.1 | 2.2 | 5.5 | 4.1 | 3.5 | 5.2 | 4.2 | 3.7 | 4.2 | 6.0 | 6.0 |
| $T_c(50)$ minutes | 10.3 | 4.7 | 3.2 | 9.7 | 8.2 | 5.5 | 15.1 | 7.7 | 7.0 | 18.2 | 16.0 | 15.2 |
| Maximum torque in. lbs. | 96 | 90 | 98 | 92 | 92 | 90 | 92 | 98 | 98 | 83 | 96 | 96 |
| Compression set, (xx) | | | | | | | | | | | | |
| O-Rings (0 25.4 × 3.53 mm): (5) | | | | | | | | | | | | |
| at 200° C. × 70 hours | 23 | 25 | 28 | 26 | 28 | 29 | 26 | 29 | 28 | 24 | 26 | 28 |
| at 200° C. × 168 hours | 32 | 34 | 37 | 28 | 31 | 33 | 29 | 33 | 35 | 29 | 31 | 33 |
| Adhesive strength (kg · cm$^{-1}$) (6) | | | | | | | | | | | | |
| after vulcanization in press at 170° C. × 8 minutes | 20 | 8 | 4 | 22 | 18 | 18 | 19 | 16 | 13 | 24 | 22 | 21 |

(xx) Vulcanization in press at 170° C. × 10 minutes, in oven at 250° C. × 16 hours.

E.1 chloride (check)—M.P.=222° C.,
E.2 tetrachlorocadmiate—M.P.=142.5° C.

TABLE NO. 5

| FORMULATION No. | 46 | 47 | 48 | 49 | 50 | 51 |
|---|---|---|---|---|---|---|
| Tecnoflon IN p. by weight | 100 | 100 | 100 | 100 | 100 | 100 |
| MgO (Maglite D) p. by weight | 5 | 5 | 5 | 5 | 5 | 5 |
| Ca(OH)$_2$ p. by weight | 5 | 5 | 5 | 5 | 5 | 5 |
| Carbon black MT p. by weight | 30 | 30 | 30 | 30 | 30 | 30 |
| Bisphenol AF p. by weight | 1.6 | 1.6 | 1.6 | 1.6 | 1.6 | 1.6 |
| Accelerator: E.1 m. equivalents | 1.0 | 1.5 | 2.0 | — | — | — |
| (e)5.2 m.Accelerator: equivalents | — | — | — | 1.0 | 1.5 | 2.0 |
| Vulcanization | | | | | | |
| in press a 170° C. × 10 minutes | | | | | | |
| in oven at 250° C. × 15 hours | | | | | | |
| 100% elongation modulus kg/cm$^2$ (3) | 58 | 60 | 61 | 60 | 62 | 64 |
| Tensile strength kg/cm$^2$ (3) | 165 | 160 | 150 | 160 | 150 | 140 |
| Elongation at break kg/cm$^2$ (3) | 185 | 175 | 165 | 180 | 170 | 160 |
| Hardness, IRHD (4) | 76 | 76 | 77 | 75 | 76 | 76 |
| Compression set, on | | | | | | |
| O-Rings (0 25.4 × 3.53 mm): (5) | | | | | | |
| at 200° C. × 70 hours | 31 | 33 | 35 | 31 | 32 | 35 |
| at 200° C. × 168 hours | 35 | 36 | 39 | 36 | 38 | 40 |
| Adhesive strength (kg · cm$^{-1}$) (6) | | | | | | |
| after vulcanization in press at 170° C. × 8 minutes | 15 | 7 | 5 | 40 | 42 | 36 |
| after post vulcanization in oven at 250° C. × 16 hours | 17 | 9 | 7 | 39 | 37 | 35 |
| after post-vulcanization in oven at 250° C. × 16 hours and aqueous treatment at 100° C. × 48 hours | 14 | 6 | 4 | 36 | 34 | 30 |

What we claim is:

1. A vulcanizable fluoroelastomeric composition, comprising:
   (A) an elastomeric copolymer based on vinylidene fluoride and on at least another fluorinated monomer;
   (B) a substance endowed with the property of neutralizing acids and selected from the group consisting of the oxides of divalent metals, hydroxides of divalent metals and mixtures of said oxides and hydroxides with metal salts of weak acids;
   (C) an aromatic polyhydroxyl compound which acts as a vulcanizing agent for the copolymer,
and characterized in that it contains, as a vulcanization accelerator, a salt consisting of a cation of phosphonium, of amino-phosphonium, or of ammonium of a type known in the art, and of a complex anion in which one atom or two atoms of a metal selected from the group consisting of Cd(II), Zn(II), Pd(II), and Ni(II) is or are bound to a halogen atom selected from the group consisting of chlorine, bromine and iodine atoms and, optionally, also to a trisubstituted phosphinic binder of the type P(C$_6$H$_5$)$_3$, P[N(CH$_3$)(C$_6$H$_5$)]$_3$, said complex anion being represented by one of the following formulae:

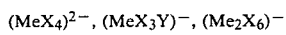

$(MeX_4)^{2-}$, $(MeX_3Y)^-$, $(Me_2X_6)^-$ wherein Me is one of the aforesaid divalent metals, X is selected from the group consisting of chlorine, bromine and iodine, Y is the aforesaid phosphinic binder, or said complex anion can be tetraphenylborate.

2. The vulcanizable fluoroelastomeric composition according to claim 1, in which an accelerator is used wherein the complex anion is tetraphenylborate.

* * * * *

UNITED STATES PATENT AND TRADEMARK OFFICE
CERTIFICATE OF CORRECTION

PATENT NO. : 4,544,708

DATED : October 1, 1985

INVENTOR(S) : MOGGI et al.

It is certified that error appears in the above-identified patent and that said Letters Patent is hereby corrected as shown below:

On the Title Page:

In the heading of the patent please amend as follows:

--[22] Filed: February 24, 1984.--

Signed and Sealed this

Twenty-first Day of April, 1987

Attest:

DONALD J. QUIGG

Attesting Officer

Commissioner of Patents and Trademarks